Jan. 2, 1968   F. F. PAWLIKOWSKI ET AL   3,361,426
NEWSPAPER JOGGER MECHANISM
Filed Sept. 13, 1965   4 Sheets-Sheet 3

INVENTORS
FRED F. PAWLIKOWSKI
ROBERT M. SINDELAR
BY

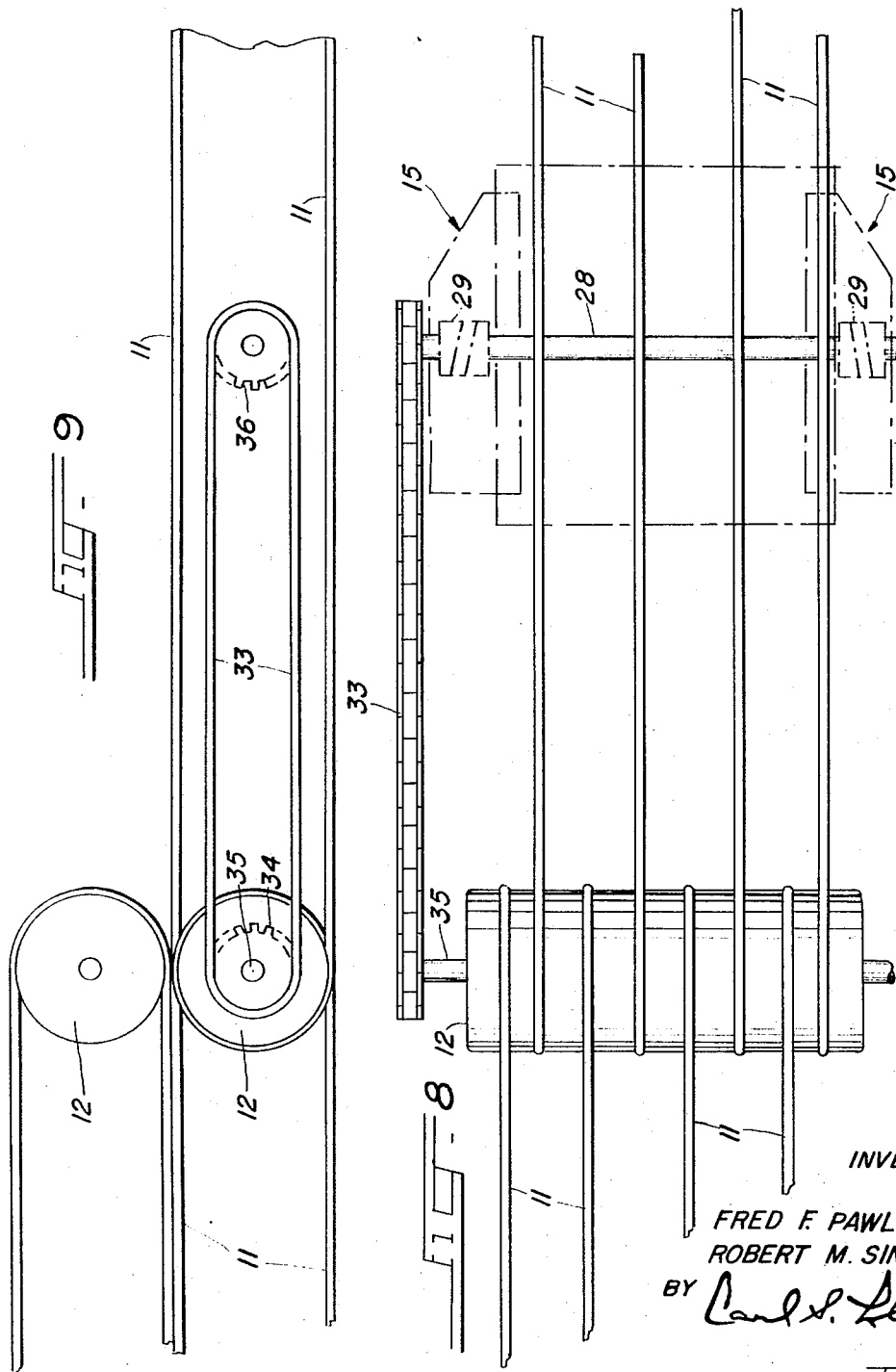

United States Patent Office 3,361,426
Patented Jan. 2, 1968

3,361,426
NEWSPAPER JOGGER MECHANISM
Fred F. Pawlikowski, Chicago, and Robert M. Sindelar, Hinsdale, Ill., assignors to Tribune Company, Chicago, Ill., a corporation of Illinois
Filed Sept. 13, 1965, Ser. No. 486,918
5 Claims. (Cl. 271—89)

ABSTRACT OF THE DISCLOSURE

A jogger mechanism operating in conjunction with a newspaper conveyor between a folder and an assembly station for bringing folded newspapers on the conveyor into alignment on the conveyor prior to delivery thereof for stacking and being tied into bundles. The mechanism comprises cam-actuated side plates or wings which are movable in unison toward and away from the path of travel of the papers whenever the conveyor is in motion to line up any papers that may have been delivered to the conveyor out of alignment or may become misaligned in the course of their travel thereon.

---

This invention relates to newspaper handling equipment and more particularly to transfer and delivery mechanism whereby finished newspapers are conveyed from the folder of a printing press to a counting, stacking and tying station where they are assembled in bundles for distribution.

Such equipment includes a conveyor by which the papers are transported a substantial distance. As fed onto the conveyor they may be in staggered or non-aligned relationship, or they may tend to get out of alignment in the course of their travel on such conveyor.

The principal object of the present invention is to provide an efficient and reliable jogger mechanism whereby the papers are brought into alignment on the conveyor so they will be delivered to the assembling station in proper alignment for stacking and assembly into bundles suitable for transportation to distributors.

A more specific object is to provide such a jogger mechanism which is actuated in synchronism with the conveyor by a drive receiving its power from the same source as the conveyor drive and preferably taking off directly from such conveyor drive.

Other objects and advantages of the invention will appear from the following description of a preferred embodiment thereof, taken in connection with the accompanying drawings, in which:

FIG. 4 is a cross-sectional view taken substantially on the section line 4—4 of FIG. 3;

FIG. 8 is a top plan view of parts of the conveyor and jogger driving mechanisms; and FIG. 9 is a side elevation of the structure shown in FIG. 8.

As is customary in newspaper conveyors of the type to which the invention relates, the conveyor consists essentially of a series of driven wires 11 (a few of which are shown) on and between which the newspapers are carried, and drums 12 (some of which are shown) over which the wires are trained. Power is derived from a motor (not shown) by which at least one of the drums is driven, the other drums being driven by the wires passing thereover. Since this mechanism is conventional it is shown only schematically (particularly in FIGS. 8, 9 and 4). Normally the wires extend upwardly from a receiving point (not shown), then over a horizontal reach, from which the views of the drawings are taken, and hence downwardly to a counting and assembly station (also not shown).

Figure 1:
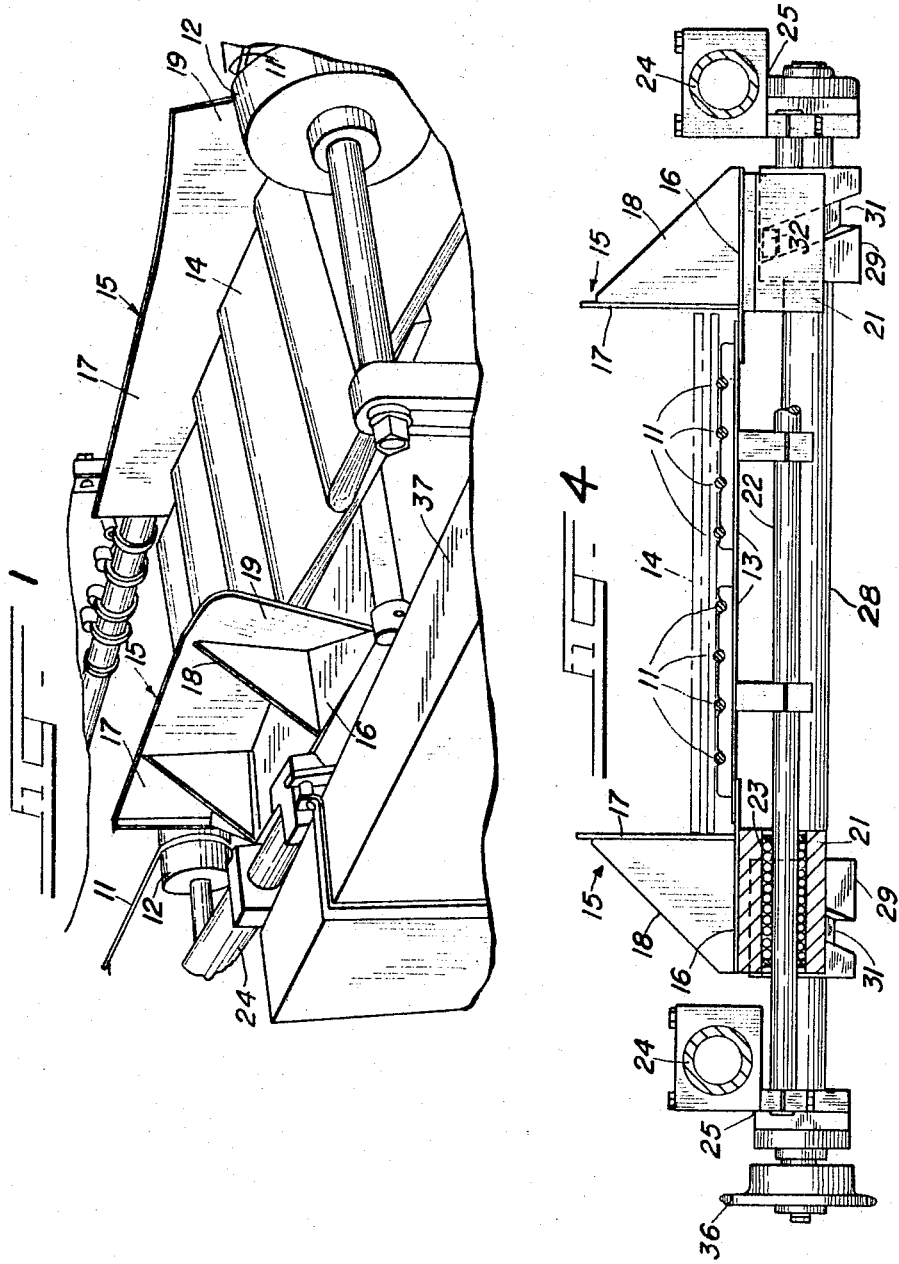
FIG. 1 is a top perspective view of parts of a conventional newspaper conveyor and of the jogger mechanism of the present invention.
Figure 2:
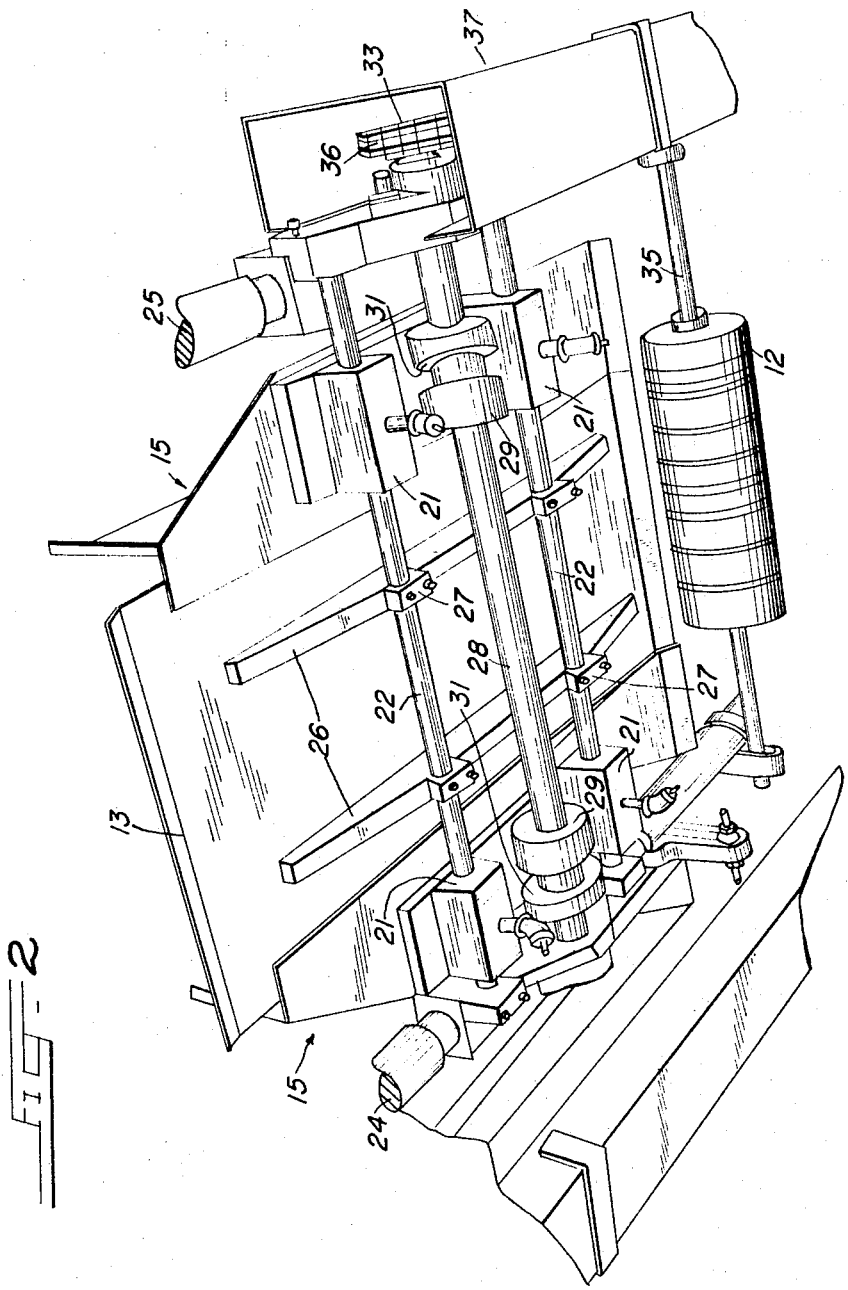
FIG. 2 is a bottom perspective view thereof.
Figure 3:
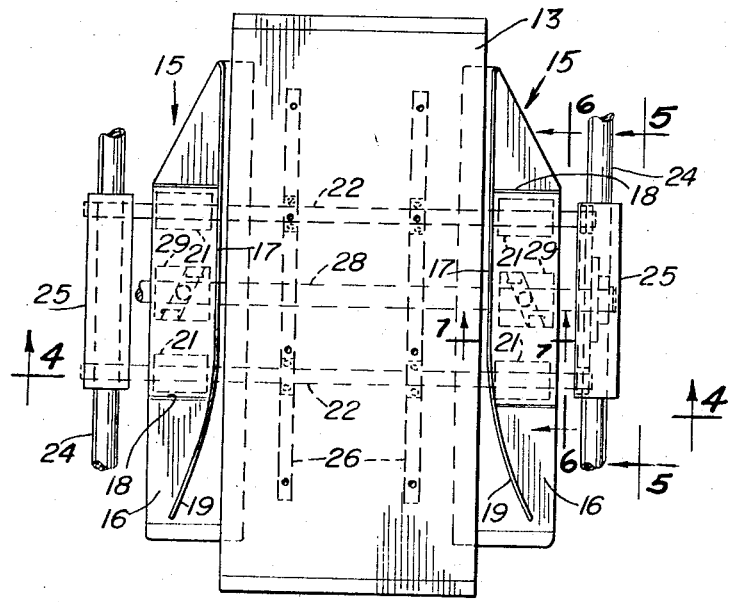
FIG. 3 is a top plan view of a stationary support plate for the conveyor and of reciprocable side plates of the jogger mechanism, with parts of the mounting and actuating means for the latter shown in dotted lines.
Figure 5:
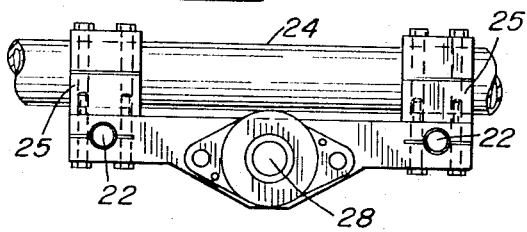
FIG. 5 is a detail side view taken from the right of FIG. 3 as indicated by the line 5—5.
Figure 6:
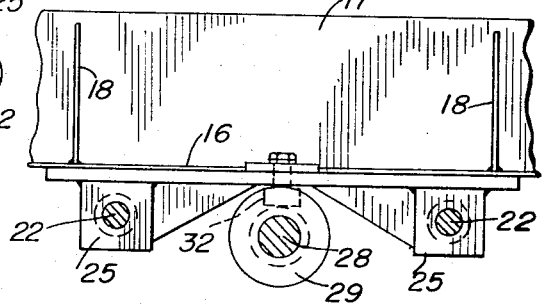
FIG. 6 is a sectional and elevational view taken on the line 6—6 of FIG. 3.
Figure 7:
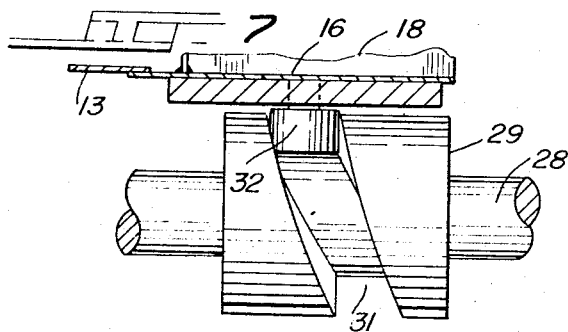
FIG. 7 is a view showing one of the actuating cams of said jogger mechanism, taken on the line 7—7 of FIG. 3.

In the upper horizontal section of the conveyor the wires pass over and beneath a stationary plate 13, above which the folded newspapers, indicated at 14 in FIG. 1, are directed by the moving wires. The papers normally overlap one another on the conveyor, as shown, and they are often somewhat out of alignment or register as delivered to the conveyor or due to vibration or other causes before they reach this point in their travel.

For the purpose of bringing them into proper alignment before they are delivered to the assembly station, we have provided a mechanism comprising a pair of laterally reciprocable members 15 positioned at opposite sides of the path of travel of the papers as they pass over the plate 13. Such members have a horizontal base portion 16 and a vertical plate 17, having webs 18 on the outer sides thereof, which webs are also attached to the base portions 16 and serve to strengthen or rigidify the structure. The plates 17 are preferably flared at their rear or receiving ends, as indicated at 19.

Spaced bearing blocks 21 are provided on the bottom side of the base portion 16 of each of said members 15 for slidably mounting said members on spaced supporting shafts or rods 22 extending transversely of the conveyor beneath the plate 13. Each bearing block 21 is preferably provided with a ball race 23 (see FIG. 4) to facilitate sliding action thereof lengthwise of the rods 22; and said rods are supported from longitudinal tubular frame members 24 by brackets 25.

Ribs 26 on the bottom of the plate 13 are also mounted on the rods 22 by means of bosses 27.

A cam shaft 28, bearinged in the brackets 25, extends transversely beneath the plate 13 substantially midway between the two stationary shafts or rods 22 and carries near the outer ends thereof cam members 29 having cam grooves 31 formed therein. One of said cam members is positioned beneath each of the slidable members 15 and each of the latter has a cam-follower 32 depending from the base portion 16 thereof and extending into the groove 31 of associated cam member 29.

The cam shaft 28 is driven from the conveyor drive mechanism (11, 12, etc.) by a take-off drive comprising a chain 33 taking over a gear 34 on a shaft 35 of one of the drums 12 and a gear 36 on one end of the cam shaft.

The drive 33 is housed in a casing 37 mounted on one side of the conventional frame structure for a conveyor of this character.

The cam shaft 28 is thus rotated continuously when the conveyor is in motion and such rotation, through the cams 29 and cam-followers 32, causes the members 15 to move in and out in opposite directions on the transverse shafts or rods 22 to thereby tamp or jog the newspapers 14 as they pass over the support plate 13 between the upright plates 17 of the members 15 and thus bring them into accurate registration so that they are properly aligned when they are moved forwardly and downwardly to the counting and assembling station.

Since the drive for the jogger mechanism is taken directly off the conveyor drive, operation of such mechanism is synchronized with the operation of the conveyor and takes place at all times when, but only when, the conveyor is in operation.

Much time is saved, and the assembly of the newspapers into neat and compact stacks and bundles is greatly facilitated, by delivery of the papers from the conveyor in proper alignment and registration as is accomplished by the use of the mechanism of our invention.

It will of course be understood that the mechanism shown and described, while a preferred embodiment of the invention, is illustrative only and that changes within the terms of the appended claims may be made without departing from the scope of the invention.

We claim:

1. A newspaper conveying and aligning mechanism, comprising:
   (a) a conveyor for transporting folded newspapers from the folder of a printing press to the counting, stacking and tying station;
   (b) a conveyor drive mechanism; and
   (c) a mechanism for jogging the newspapers into alignment in the course of their travel on said conveyor, including
      (1) a pair of upstanding, longitudinally-extending, laterally-slidable side plates disposed on opposite sides of the path of travel of the newspapers on said conveyor;
      (2) a shifter mechanism for laterally moving said plates in unison in opposite directions inwardly toward and outwardly away from said newspapers to that on the inward stroke of said plates the latter engage the side edges of a group of the folded papers to bring any that may be misaligned into alignment on the conveyor; and
      (3) a drive for said shifter mechanism taking off from and driven by said conveyor drive mechanism, whereby said jogging mechanism is actuated in timed relationship to the movement of the conveyor whenever the latter is in motion.

2. A newspaper conveying and aligning mechanism as set forth in claim 1, in which the side plates are provided with laterally-extending base portions each having a downwardly-extending cam follower thereon and the shifter mechanism includes a horizontal cross shaft having spaced cams thereon which are engaged respectively by said cam-followers.

3. A newspaper conveying and aligning mechanism as set forth in claim 2, in which the shifter mechanism includes a plurality of cross shafts on which the base portions of the side plates are slidably mounted.

4. A newspaper conveying and aligning mechanism as set forth in claim 2, in which the cams have a wide throw and the side plates are in the form of wings having outwardly-flared receiving ends.

5. A newspaper conveying and aligning mechanism, comprising:
   (a) a conveyor for transporting folded newspapers arranged in overlapping relationship from the folder of a printing press to counting, stacking and tying station;
   (b) a conveyor drive mechanism; and
   (c) a mechanism for jogging the newspapers into alignment in the course of their travel on said conveyor, including
      (1) a pair of upstanding, longitudinally-extending, laterally-slidable side plates disposed on opposite sides of the path of travel of the newspapers on said conveyor, and flared outwardly at their receiving ends, said plates being in the form of angular reinforced members each having a base portion with a cam-follower carried thereby;
      (2) a plurality of cross shafts on which said members are slidably mounted;
      (3) a shifter mechanism including a cam shaft with spaced cams thereon engaged respectively by said cam-followers for laterally moving said plates in unison in opposite directions inwardly toward and outwardly away from said newspapers so that on the inward stroke of said plates the latter engage the side edges of a number of successively positioned papers to bring any that may be misaligned into alignment on the conveyor; and
      (4) a drive for said shifter mechanism taking off from and driven by said conveyor drive mechanism whereby said jogging mechanism is actuated in timed relationship to the movement of the conveyor whenever the latter is in motion.

References Cited
UNITED STATES PATENTS

| | | | |
|---|---|---|---|
| 640,570 | 1/1900 | King | 271—59 |
| 1,961,366 | 6/1934 | Knowlton | 271—89 |
| 2,482,443 | 9/1949 | Tornros | 271—59 |
| 2,484,845 | 10/1949 | Nordquist et al. | 271—49 |
| 3,061,303 | 10/1962 | Glaser et al. | 271—59 |

RICHARD E. AEGERTER, *Primary Examiner.*

M. HENSON WOOD, JR., *Examiner.*

J. N. ERLICH, *Assistant Examiner.*